Sept. 26, 1933.　　　G. B. WATKINS ET AL　　　1,928,160
APPARATUS FOR SEALING LAMINATED GLASS
Filed June 2, 1932
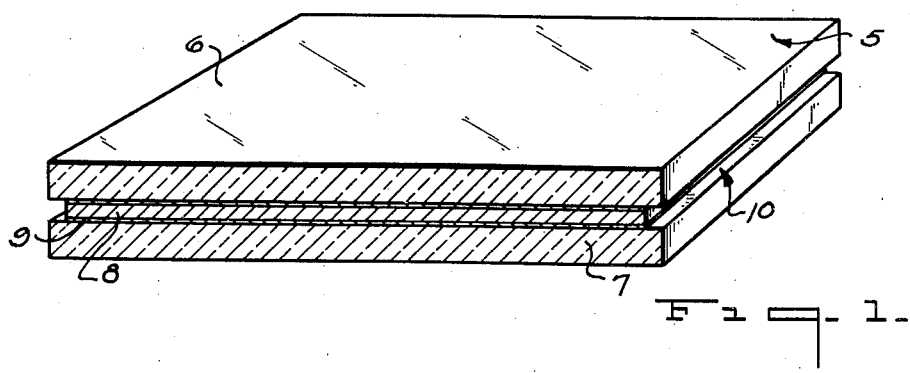
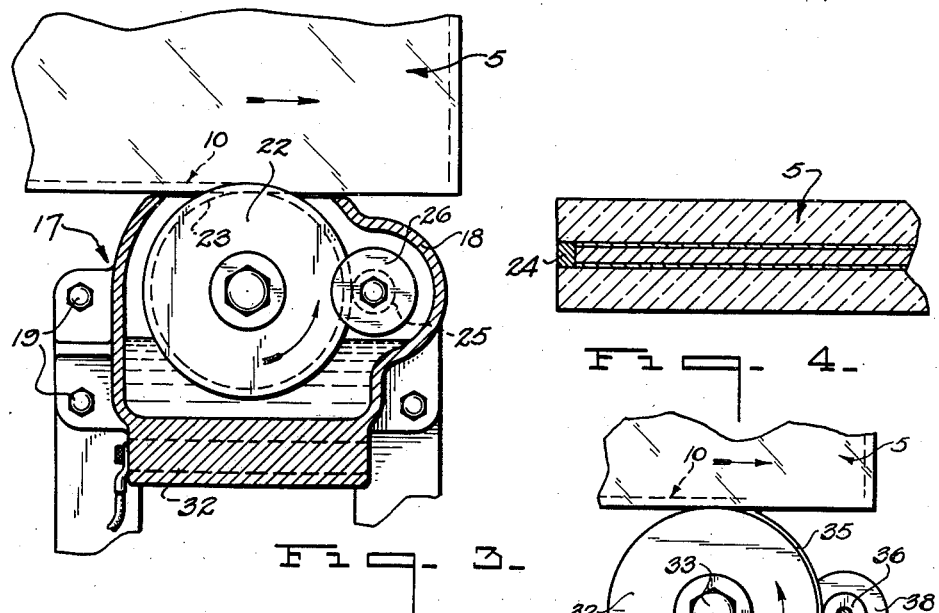
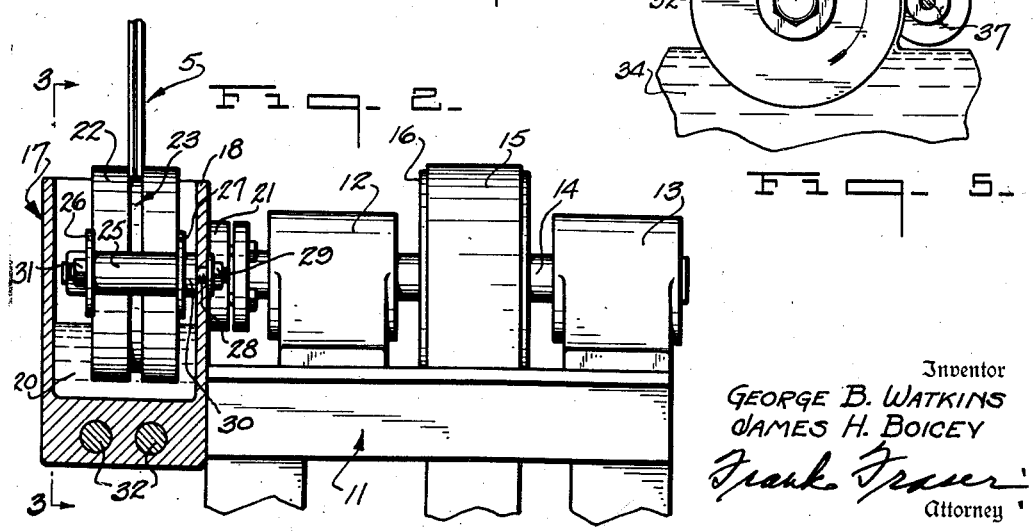
Inventor
GEORGE B. WATKINS
JAMES H. BOICEY
Frank Fraser
Attorney Patented Sept. 26, 1933

1,928,160

UNITED STATES PATENT OFFICE 1,928,160

APPARATUS FOR SEALING LAMINATED GLASS

George B. Watkins and James H. Boicey, Toledo, Ohio, assignors to Libbey-Owens-Ford Glass Company, Toledo, Ohio, a corporation of Ohio Application June 2, 1932. Serial No. 614,970

10 Claims. (Cl. 49—81)

The present invention relates broadly to the manufacture of laminated or safety glass and more particularly to a machine or apparatus of an improved character for sealing the edges thereof.

Laminated or safety glass is ordinarily produced by uniting two or more sheets of glass and one or more sheets of a suitable non-brittle material to form a composite structure, one sheet of non-brittle material being usually interposed between and bonded to two sheets of glass. When the proper materials are used and an adequate bond obtained between the several sheets, laminated glass is desirable for the reason that it is practically non-shatterable or non-scatterable. In order to protect the non-brittle sheet and the bond between the laminations from disturbing atmospheric conditions, the practice of sealing or luting the edges of the laminated sheet is sometimes followed. This sealing is accomplished by first providing a continuous channel or groove around the edges of the laminated sheet between the adjacent sheets of glass, and in then filling in this channel or groove with a suitable sealing material.

The principal aim and object of this invention resides in the provision of a novel and improved machine or apparatus by the use of which the sealing of the edges of laminated sheets of glass may be effected rapidly and conveniently and in a thorough and efficient manner.

Another important object of the invention resides in the provision of a sealing machine or apparatus embodying a compressible or resilient sealing element with which the laminated sheet is adapted to contact and which is maintained entirely outside of the groove or channel in the edge of said sheet during the sealing thereof.

Other objects and advantages of the invention will become more apparent during the course of the following description when taken in connection with the accompanying drawing.

In the drawing forming a part of this application and wherein like numerals are employed to designate like parts throughout the same, Fig. 1 is a perspective sectional view of a sheet of laminated glass prior to the sealing thereof, Fig. 2 is a side elevation, partially in section, of the improved sealing machine or apparatus provided by the present invention, Fig. 3 is a section taken substantially on line 3—3 of Fig. 2, Fig. 4 is a fragmentary sectional view of the laminated sheet subsequent to sealing, and Fig. 5 is a side elevation, partially in section, of a slightly modified type of machine or apparatus.

In Fig. 1 of the drawing, there is illustrated a sheet of laminated or safety glass 5 composed of two sheets of preferably transparent glass 6 and 7 between which is interposed a sheet or membrane 8 of some suitable non-brittle material joined or bonded to the glass sheets by any suitable adhesive or bond-inducing medium 9 whereby to create a composite structure. The surfaces of the glass sheets may or may not be ground and polished as desired, and it is to be understood that the present invention is not restricted to any particular type of laminated glass, the materials used in its structure, or the process of compositing.

As shown in Fig. 1, a continuous channel or groove 10 is provided around the edges of the laminated sheet between the two sheets of glass, and it is into this channel or groove that the seal is adapted to be placed so as to protect the non-brittle membrane 8 and the bonding medium 9 from the atmosphere. This channel or groove may be formed by uniting the glass sheets with a slightly smaller sheet of non-brittle material, or the sheet of non-brittle material may be initially as large as the glass sheets and then subsequently cut back from the edges of the glass sheets to form the groove or channel.

In Figs. 2 and 3 is shown an improved sealing machine or apparatus constructed in accordance with the present invention. This sealing apparatus includes a horizontal supporting bed or frame 11 upon which are mounted the spaced bearings 12 and 13 within which is journaled a horizontal shaft 14 driven in any desired manner such as by means of a belt 15 trained about the drum or pulley 16 fixed to said shaft.

The sealing unit per se is designated in its entirety by the numeral 17 and comprises in its construction a receptacle 18 preferably removably secured to the supporting frame 11 at one end thereof by means of bolts or the like 19, said receptacle containing a suitable sealing liquid 20. The receptacle 18 is also provided with a bearing portion 21 within which the shaft 14 is journaled, said shaft projecting through said bearing portion into said receptacle. Mounted upon shaft 14 within receptacle 18 is the sealing element 22 comprising a disc or wheel provided with a continuous groove 23 extending around the periphery thereof. The rotatable sealing wheel 22 is adapted to have the lower portion of its periphery immersed within the sealing liquid 20, while the upper portion of its periphery terminates slightly above the receptacle 18.

The sealing wheel is formed of a compressible or resilient material such as for example rubber, rubber composition or the like. A sealing wheel constructed as above described and formed of rubber has been used with very satisfactory results.

In carrying out the present invention, a desired amount of sealing liquid 20 is first placed within the receptacle 18, and although this liquid is not adapted to entirely fill the receptacle, the amount used must be sufficient so that the lower portion of the sealing wheel 22 will be immersed therein. The laminated sheet 5 is then held in a vertical position, being supported upon the sealing wheel 22, with the edge to be sealed at the bottom thereof and received within the groove 23 of the sealing wheel. The shaft 14 is then driven to effect rotation of the sealing wheel in the direction indicated by the arrow in Fig. 3, and simultaneously the laminated sheet is moved horizontally over said wheel, preferably in a direction opposite to the direction of rotation thereof. As the sheet is moved along over the rotating wheel, the said wheel will function to pick up the sealing material 20 and force it into the groove of the laminated sheet. In this way, the said groove or channel in the laminated sheet will be completely filled so as to form a seal 25 as shown in Fig. 4. The groove 23 in sealing wheel 22 may be of a width substantially equal to the thickness of the laminated sheet 5 and of a depth substantially equal to the depth of the channel or groove 10. During the sealing of the laminated sheet, the sealing wheel will be slightly compressed thereby but will spring back to its natural shape when the pressure of the sheet thereupon is removed therefrom.

In order to control the amount of material being carried upwardly by the sealing wheel 22 to the laminated sheet 5, there is provided an idler roller 25 also arranged within the receptacle 18 and engaging the periphery of the sealing wheel. This roller is preferably of metal and is clamped between the two discs 26 and 27 which overlap the opposite side faces of the sealing wheel. The roller 25 and discs 26 and 27 are mounted upon a pin 28 which passes through the inner wall of receptacle 18 and has threaded upon its inner end a nut 29. Also carried by the pin 28 and interposed between the inner wall of the receptacle and the disc 27 is a collar 30, while threaded upon the outer end of the pin outwardly of disc 26 is a nut 31. As pointed out above, the roller 25 contacts with the periphery of the sealing wheel 22 and serves to control the amount of sealing material being carried upwardly by the wheel. As a matter of fact, due to the provision of the roller 25, the sealing wheel will carry upwardly only that amount of sealing material which can be contained within the groove 23. In other words, the roller acts more or less as a scraper to prevent any excess of sealing material from being carried upwardly. For the purpose of maintaining the sealing liquid at the desired workable temperature, suitable heating means, such as the electrical heating elements 33, may be associated with the receptacle 18.

In Fig. 5 of the drawing there is illustrated a slightly modified type of sealing apparatus embodying the principles of the present invention. The sealing disc or wheel is here designated by the numeral 32 and is mounted upon a horizontally disposed rotary shaft 33, with the lower portion thereof immersed within the sealing material 34. The sealing wheel 32 is also adapted to be formed of a compressible or resilient material, preferably rubber or a rubber composition. However, this wheel differs from sealing wheel 22 above described in that it is not provided with any groove in the periphery thereof. Upon rotation of the sealing wheel 32 in the direction indicated by the arrow, the said wheel is adapted to carry up the desired amount of sealing material 35 and to force it into the groove 10 of the laminated sheet 5 which, as described above, is adapted to be simultaneously moved horizontally over and in contact with the periphery of said sealing wheel. In order to control the amount of sealing material being carried upwardly by said wheel, there is provided opposite the periphery of the wheel a roller 36 similar to roller 25 and mounted upon a pin 37. Disposed at each end of the roller is a circular plate 38, and these plates are adapted to overlap the side faces of the sealing disc. It has been found that under certain operating conditions, the use of a compressible sealing wheel having a continuous groove formed in the periphery thereof is desirable, while under other operating conditions, a compressible sealing wheel having no groove in its periphery is to be preferred.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. The process of sealing the edges of laminated sheet glass including two sheets of glass and an interposed sheet of non-brittle material and wherein the edge to be sealed is provided with a channel or groove, which consists in passing the sheet in a definite substantially horizontal path over and in contact with the outer surface of a sealing element, in supplying a sealing material to said element, and in revolving said element to force the sealing material upwardly into the groove of the laminated sheet while maintaining said sealing element exteriorly of said groove.

2. The process of sealing the edges of laminated sheet glass including two sheets of glass and an interposed sheet of non-brittle material and wherein the edge to be sealed is provided with a channel or groove, which consists in passing the sheet to be sealed in a definite substantially horizontal path, in revolving in contact with the edges of the glass sheets a sealing element which is arranged entirely outside of the groove, and in supplying a sealing material to said sealing element.

3. In an apparatus for sealing the edges of laminated glass comprising two sheets of glass and an interposed layer of plastic material of less area than the area of the glass sheets to provide a seal receiving channel around the marginal portions of said laminated glass, a receptacle for containing a supply of sealing material, a sealing wheel associated therewith and having at least a portion thereof arranged within the sealing material and against which the edge of the laminated glass is moved to be sealed, and means for rotating the sealing wheel in a direction opposite to the movement of the laminated glass to advance the sealing material from the receptacle to the said channel, the structure of the sealing wheel being such that no portion thereof is received within the channel of the laminated glass during the entire sealing operation.

4. In an apparatus for sealing the edges of laminated glass comprising two sheets of glass and an interposed layer of plastic material of less area than the area of the glass sheets to provide a seal receiving channel around the marginal portions of said laminated glass, a receptacle for containing a supply of sealing material, a sealing wheel associated therewith and having at least a portion thereof arranged within the sealing material, said sealing wheel having a continuous groove formed in the periphery thereof of a width slightly in excess of the width of the laminated sheet to be sealed and of a depth substantially the same as the depth of the channel formed around the marginal portions of said glass, and means for rotating the sealing wheel while the laminated sheet is moved horizontally with the edge to be sealed thereof disposed within the groove for filling the channel with the sealing material, the shape of the groove formed in the periphery of the sealing wheel being such that no portion of the sealing wheel is received within the channel of the laminated glass during the entire sealing operation.

5. In an apparatus for sealing the edges of laminated glass comprising two sheets of glass and an interposed layer of plastic material of less area than the area of the glass sheets to provide a seal receiving channel around the marginal portions of said laminated glass, a receptacle for containing a supply of sealing material, a compressible sealing wheel associated therewith and having at least a portion thereof arranged within the sealing material, said compressible sealing wheel having a continuuos groove formed in the periphery thereof of a width slightly in excess of the width of the laminated sheet to be sealed and of a depth substantially the same as the depth of the channel formed around the marginal portions of said glass, and means for rotating the compressible sealing wheel while the laminated sheet is moved horizontally with the edge to be sealed thereof disposed within the groove for filling the channel with the sealing material, the shape of the groove formed in the periphery of the compressible sealing wheel being such that no portion of the compressible sealing wheel is received within the channel of the laminated glass during the entire sealing operation.

6. In an apparatus for sealing the edges of laminated glass comprising two sheets of glass and an interposed layer of plastic material of less area than the area of the glass sheets to provide a seal receiving channel around the marginal portions of said laminated glass, a receptacle for containing a supply of sealing material, a sealing wheel associated therewith and having at least a portion thereof arranged within the sealing material, said sealing wheel having a continuous groove formed in the periphery thereof of a width slightly in excess of the width of the laminated sheet to be sealed and of a depth substantially the same as the depth of the channel formed around the marginal portions of said glass, and means for rotating the sealing wheel in a direction opposite to the movement of the laminated glass while the laminated sheet is moved horizontally with the edge to be sealed thereof disposed within the groove for filling the channel with the sealing material, the shape of the groove formed in the periphery of the sealing wheel being such that no portion of the sealing wheel is received within the channel of the laminated glass during the entire sealing operation.

7. In an apparatus for sealing the edges of laminated glass comprising two sheets of glass and an interposed layer of plastic material of less area than the area of the glass sheets to provide a seal receiving channel around the marginal portions of said laminated gass, a receptacle for containing a supply of sealing material, a sealing wheel associated therewith and having at least a portion thereof arranged within the sealing material, said sealing wheel having a continuous groove formed in the periphery thereof of a width slightly in excess of the width of the laminated sheet to be sealed and of a depth substantially the same as the depth of the channel formed around the marginal portions of said glass, means for rotating the sealing wheel while the laminated sheet is moved horizontally with the edge to be sealed thereof disposed within the groove for filling the channel with the sealing material, the shape of the groove formed in the periphery of the sealing wheel being such that no portion of the sealing wheel is received within the channel of the laminated glass during the entire sealing operation, and means for controlling the amount of sealing material being carried upwardly by said wheel.

8. In an apparatus for sealing the edges of laminated glass comprising two sheets of glass and an interposed layer of plastic material of less area than the area of the glass sheets to provide a seal receiving channel around the marginal portions of said laminated glass, a receptacle for containing a supply of sealing material, a compressible sealing wheel associated therewith and having at least a portion thereof arranged within the sealing material, said compressible sealing wheel having a continuous groove formed in the periphery thereof of a width slightly in excess of the width of the laminated sheet to be sealed and of a depth substantially the same as the depth of the channel formed around the marginal portions of said glass, means for rotating the compressible sealing wheel while the laminated sheet is moved horizontally with the edge to be sealed thereof disposed within the groove for filling the channel with the sealing material, the shape of the groove formed in the periphery of the compressible sealing wheel being such that no portion of the compressible sealing wheel is received within the channel of the laminated glass during the entire sealing operation, and a roller positioned opposite the periphery of the sealing wheel for controlling the amount of sealing material being advanced toward the channel by said wheel.

9. The process of sealing the edges of laminated glass comprising two sheets of glass and an interposed layer of plastic material of less area than the area of the glass sheets to provide a seal receiving channel around the marginal portions of said laminated glass consisting in passing the sheet to be sealed in a substantially horizontal path through a peripheral groove formed in a rotatable wheel and in rotating the grooved wheel in a direction opposite to the movement of the sheet to deposit the sealing material in the channel of the laminated sheet.

10. The process of sealing the edges of laminated glass comprising two sheets of glass and an interposed layer of plastic material of less area than the area of the glass sheets to provide a seal receiving channel around the marginal portions of said laminated glass consisting in passing the edge of the laminated glass to be sealed through a peripheral groove formed in a rotatable member which is rotating through a bath of sealing material in a manner to move the same material upwardly in the groove and into the channel of the laminated glass while maintaining the rotatable member entirely outside of the groove during the entire sealing operation.

GEORGE B. WATKINS.
JAMES H. BOICEY.